United States Patent [19]
Jung et al.

[11] Patent Number: 6,016,847
[45] Date of Patent: Jan. 25, 2000

[54] FLEXIBLE TUBULAR CONDUIT

[75] Inventors: Patrice Jung, La Mailleraye; Guy Le Bail, Yaniville, both of France

[73] Assignee: COFLEXIP, Paris, France

[21] Appl. No.: 08/087,030

[22] Filed: Jul. 6, 1993

Related U.S. Application Data

[63] Continuation of application No. 07/870,101, Apr. 16, 1992, abandoned, which is a continuation of application No. 07/615,498, Nov. 19, 1990, abandoned.

[30]   Foreign Application Priority Data

Nov. 21, 1989 [FR]   France .................................. 89 15272

[51] Int. Cl.⁷ ................................................. F16L 11/16
[52] U.S. Cl. .......................... 138/131; 138/135; 138/150; 138/154; 138/173
[58] Field of Search .................................. 138/122, 129, 138/131, 133, 134, 135, 136, 150, 154, 173

[56]           References Cited

U.S. PATENT DOCUMENTS

| | | | |
|---|---|---|---|
| 1,365,306 | 1/1921 | Dickinson | 138/135 |
| 1,476,704 | 12/1923 | Fulton | 138/136 |
| 1,954,724 | 4/1934 | Collom | 138/131 |
| 1,960,139 | 5/1934 | Collom | 138/135 |
| 2,034,561 | 3/1936 | Davis | 138/134 |
| 2,056,840 | 10/1936 | Collom | 138/135 |
| 2,402,497 | 6/1946 | Johnson | 138/135 |
| 3,251,612 | 5/1966 | Webbe . | |
| 3,442,297 | 5/1969 | Wesesky | 138/122 |
| 4,403,631 | 9/1983 | Abdullaev et al. | 138/134 |
| 4,727,909 | 3/1988 | Griffiths | 138/131 |

FOREIGN PATENT DOCUMENTS

| | | | |
|---|---|---|---|
| 679770 | 11/1930 | France | 138/135 |
| 0855177 | 5/1940 | France | 138/125 |
| 1367139 | 6/1964 | France . | |
| 2569462 | 7/1985 | France . | |
| 0510995 | 1/1955 | Italy | 138/135 |
| 0025910 | 11/1913 | United Kingdom | 138/135 |

OTHER PUBLICATIONS

American Metal Hose from Engineering News Dec. 2, 1915.
Chicago Metal Hose Corporation Catalog Dec. 23, 1940 pp. 25, 31, 34, and 38.

*Primary Examiner*—James F. Hook
*Attorney, Agent, or Firm*—Schweitzer Cornman Gross & Bondell LLP

[57]           ABSTRACT

The invention relates to a flexible tubular conduit having at least one tubular layer constituted by at least one molded strip of a cross section substantially in the form of an elongated S, wound helically and having a cross section formed of a first and of a second principal cylindrical coaxial spans joined together by an inclined central portion, each of the first and second principal cylindrical spans being united by a first convex radial portion to a first secondary cylindrical span and by a second convex radial portion to a second secondary span. The second secondary span comprises a section connecting to the second convex radial portion (9), an end section (12) and a like intermediate section (13) whose concavity is turned away from the second principal span (6), and the second secondary span (12, 13) is arranged such that, when the strip is in the wound state, the connecting section is thrusting against the first principal span (5') of an adjacent spiral, and the end section (12) applies itself to the said first principal span (5')

13 Claims, 2 Drawing Sheets

FLEXIBLE TUBULAR CONDUIT

This application is a continuation of Ser. No. 07/870,101, filed Apr. 16, 1992, now abandoned, which is a continuation of Ser. No. 07/615,498, filed Nov. 19, 1990, now abandoned.

BACKGROUND OF THE INVENTION

The present invention relates to a flexible tubular conduit of the type having at least one tubular layer constituted by at least one shaped band of a cross section substantially in the form of an elongated S, helically wound with a small pitch and with its successive spirals interlocked.

The applicant company has for many years manufactured and sold flexible tubular conduits of great length, of high mechanical strength, useful particularly for carrying hydrocarbons, particularly in connection with undersea petroleum producing installations.

Such flexible conduits generally comprise a tubular layer constituted by a double-interlocking strip, this layer being able to constitute the internal body of the flexible conduit in "rough bore" type conduits, an armor designed to give the flexible tubular conduit great resistance to internal pressure and to traction, an intermediate sealing sheath and, if necessary, an external protective sheath.

In conduits of the "smooth bore" type the intermediate sealing sheath is replaced by an internal sheath or tube of plastic or elastomeric material.

To manufacture such tubular layers, a flat metal strip, such as stainless steel strapping, is deformed plastically to make a shaped or profiled strip having a crimpable cross-sectional shape, and this strip is wound helically with a small pitch and with interlocking of the successive spirals. The flexibility of the tubular layer is obtained by the existence of a certain axial free play between the successive crimpable spirals. The shaped or profiled strip has a cross section formed of a first and a second principal coaxial cylindrical span spaced radially apart and joined together by a central span that is inclined with respect to the longitudinal axis of the conduit, each of the first and second principal spans being joined by a first and second convex radial span, respectively, to a first and second secondary span, respectively, at least one of the said secondary spans being cylindrical, coaxial with respect to the principal spans, and spaced radially away from the latter.

Also known are conduits of a first type of construction comprising a tubular layer constituted by a molded strip whose both secondary portions are cylindrical, for example the flexible crimped metal tubes defined by Standard NF E-29-828.

A more or less great radial free play can exist between the different confronting spans such that the resistance to crushing radially is relatively low.

In a second type of construction, the first secondary portion is cylindrical, while the second secondary portion is constituted by a concave axial section whose concavity faces in the opposite direction from the second principal portion and which constitutes a prolongation of the end of the convex radial portion which prolongs the said second principal portion.

An illustration of this type of tubular layer is given in French patents A-2,569,462, A-2,559,920, or A-1367139.

In a variant of this type of construction, provision is made for inserting a gasket, particularly of copper or asbestos, in the fold formed between the axial, concave end section and the first principal span of the adjacent spiral. An illustration of this type of tubular layer is given in French standards NF-E-29-829, /-832 or /-833.

In the type of construction comprising a concave axial section, the contact between the second secondary span of one spiral and the first principal span of the adjacent spiral must normally be made only at the zone of transition between the convex radial portion and the concave axial end section.

Consequently it has been found that the resistance to crushing of the shaped tubular layer and of the flexible tubular conduit incorporating this layer may prove insufficient when the mechanical stresses which it must withstand are great, particularly in applications where a high pressure is applied to the exterior of the conduit. Thus, mention can be made of the case of flexible tubular conduits used for carrying hydrocarbons in deep waters where a high hydrostatic pressure prevails, where the tubular layer has to withstand the crushing effect due to the hydrostatic pressure and to the induced effects of the loads supported by the traction fittings which are stressed by the considerable weight of the conduit.

One condition necessary for obtaining great resistance to crushing, as well as good performance in the case of dynamic effects, is that, on the one hand, the tubular layer be made with a precise interlocking, without radial free play between the confronting portions of the adjacent spirals, and that, on the other hand, the cross section of the shaped strip have an actual configuration in conformity with its theoretical definition, without having defects such as excessive zones of curvature. In practice, to prevent the risk of radial free play, the tubular layers are made with a limited radial clamping effect. As a result of the very close tolerances thus imposed on the finished product, the industrial production has to be performed with a special care which increases costs.

SUMMARY OF THE PRESENT INVENTION

The present invention proposes to make a flexible tubular conduit which will have especially a high resistance to crushing, while still being able to be carried out at low production costs. In addition to the cost reduction obtained by easier and quicker manufacture, the present invention also aims to reduce the weight of the tubular layer for a given crushing resistance making it possible, on the one hand, to reduce the weight and the cost of the raw materials used in manufacture, and on the other hand to achieve flexible conduits which can be used in greater depths of water.

In the flexible tubular conduit according to the invention, the first secondary portion of the spirally wound shaped strip, is spaced radially from the first principal cylindrical span at such a distance that, when the shaped strip is in the wound state it applies itself substantially on its entire length to the second principal span of an adjacent spiral, the said conduit being essentially characterized by the fact that the second secondary span includes a section, preferably cylindrical, connecting to the second convex radial portion, a cylindrical or slightly conical end section and, between the said sections, a looped intermediate section whose hollow side is turned away from that of the second principal span, and that the second secondary span is arranged such that, when the strip is in the wound state, the said connecting section of the second secondary span is thrusting against the first principal span of the other adjacent spiral, the said end section of the second secondary span applies itself to the said first principal span of the other adjacent spiral and, preferably, the crest of the intermediate section applies itself to the first secondary span of the said other adjacent spiral.

The end section of the second secondary span is preferably cylindrical, and it applies itself substantially on its entire length to the first principal span of the other adjacent spiral. This end section can nevertheless, according to the invention, be slightly conical, i.e., can form with the axis of the conduit an angle of less than about 10 degrees, and preferably on the order of 5 degrees.

Thus, when the strip is in the wound state, there exists between each of the principal spans of a spiral and a principal span of the adjacent spiral a crush-resistant structure due to a double thrust of the end section and of the connecting section of the second secondary span against the first principal span of the adjacent spiral and of the flexural rigidity conferred by the looped intermediate section. The thrust of the looped intermediate section against the first secondary span of the spiral which is itself in contact with the second principal span of the spiral in question, makes it possible to further increase the rigidity of the shaped strip by providing an arched supporting effect, the middle portion of the looped intermediate section being able to have a rounded cross section or to have a cylindrical central span.

According to the invention, the lengths of the end section and of the connecting section of the second secondary span can be as desired and, at the limit, small. It matters only that there be a contact without clearance at either end of the looped intermediate portion between the second secondary span of a spiral and the first principal span of the adjacent spiral, and that the oblique portion at the end of the looped intermediate portion be joined progressively and substantially tangentially to the end section.

Advantageously, the dimensional characteristics of the shaped or profile strip forming the tubular layer of the flexible tubular conduit according to the invention are as follows with respect to the thickness e of the strip or to the inside diameter D of the finished tubular layer.

1) Length b of the end portion of the second secondary span $b \leq 0.5e$, and preferably
$0.5e \leq b \leq 2e$ 2) Length a of the looped intermediate section of the second secondary span $3e \leq a \leq 8e$ 3) Height d of the looped intermediate section of the second secondary span $0.5e \leq d \leq 3.5e$ 4) Length c of the connecting section of the second secondary span $c \leq 4e$ 5) Thickness h of the tubular layer formed by the winding of the molded strip, i.e., the radial distance between the inner face of the principal span of a spiral constituting the inner surface of the tubular layer and the outer surface of the principal span of the adjacent spiral constituting the outer surface of the tubular layer:

$h \geq 4.5e$

6) Width l of the shaped or profiled strip, i.e., the distance measured axially between the crests of the convex radial spans of the strip $50e \leq l \leq 100e$ 7) Average pitch P of the helix formed by the winding, i.e., the distance measured axially between the first convex radial spans of two successive spirals, the axial free play between the successive spirals being assumed equal to its average value:

$0.05D \leq P \leq 0.5D$.

The looped intermediate section has a middle portion of rounded cross section or consists of a cylindrical central span bracketed between two curved segments. This middle portion whose crest or central span, as the case may be, is preferably thrusting against the first secondary portion of the adjacent, is bracketed between two transitional lateral portions. These two transitional portions of curved shape, whose sense of curvature is opposite with respect to that of the middle portion, or that of the curved segments as the case may be, connect tangentially to the end section and to the connecting section, respectively. The middle portion connects tangentially to each of the two transitional lateral portions, either (preferably) with a point of flexure, or a straight connecting segment of a length preferably shorter than 2 e. The angle formed by a tangent to the point of flexure or the straight segment, with respect to the axis of the tubular layer, is preferably between 45 and 80 degrees.

A molded strip according to the invention has a particularly high resistance to crushing when the radius of curvature of each of the curved zones has the largest value compatible with the dimensions characterizing the section of molded strip in question. Interesting results have been obtained with radius of curvature values in the most severely curved zones on the order of 1.5 e, the radius of curvature being figured on the center line [?], but it is preferable that, at any point on the cross section the radius of curvature will not be less than this. The molded strip according to the invention can be made by the conventional cold forming techniques by means of a shaping roller, and in particular it can be formed continuously in a continuous spiral winding process to form flexible tubular conduits such as described in the applicant's French patent A-2,555,920.

To assist in the understanding of the invention a description will now be given of an embodiment presented by way of example, which is by no means intended to limit it, in conjunction with the appended drawing wherein:

DETAILED DESCRIPTION OF THE INVENTION

Figure 1:
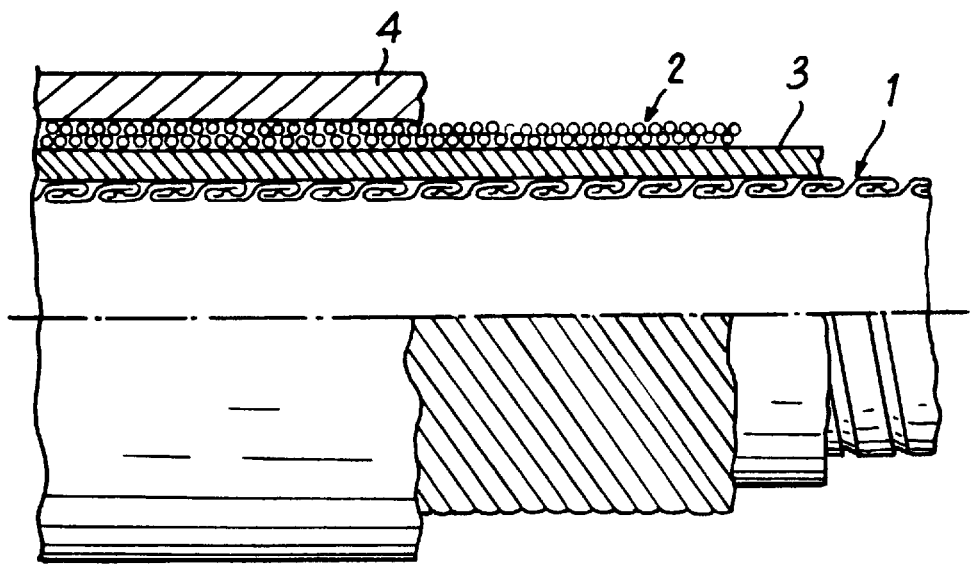
FIG. 1 is a diagrammatic view, partially in longitudinal section, of a first embodiment of flexible tubular conduit according to the invention.

FIG. 1 shows a flexible tubular conduit of the "rough bore" type incorporating a tubular layer 1 constituted by a molded strip spirally wound with a low pitch, and with the successive spirals interlocked.

The shape of the cross section of the strip will be described further on in connection with FIG. 3.

This layer 1 is, in the example illustrated, an internal body designed to give the conduit resistance to crushing effects.

The conduit has, in addition to layer 1, an armature 2 of high tensile strength and resistance to internal pressure constituted preferably by one or more pairs of crossed layers of hard metal wire or made of high tensile strength composite materials. Lastly, the tubular conduit includes a waterproof internal lining 3 disposed between layers 1 and 2 and an outer sheath 4.

Figure 2:
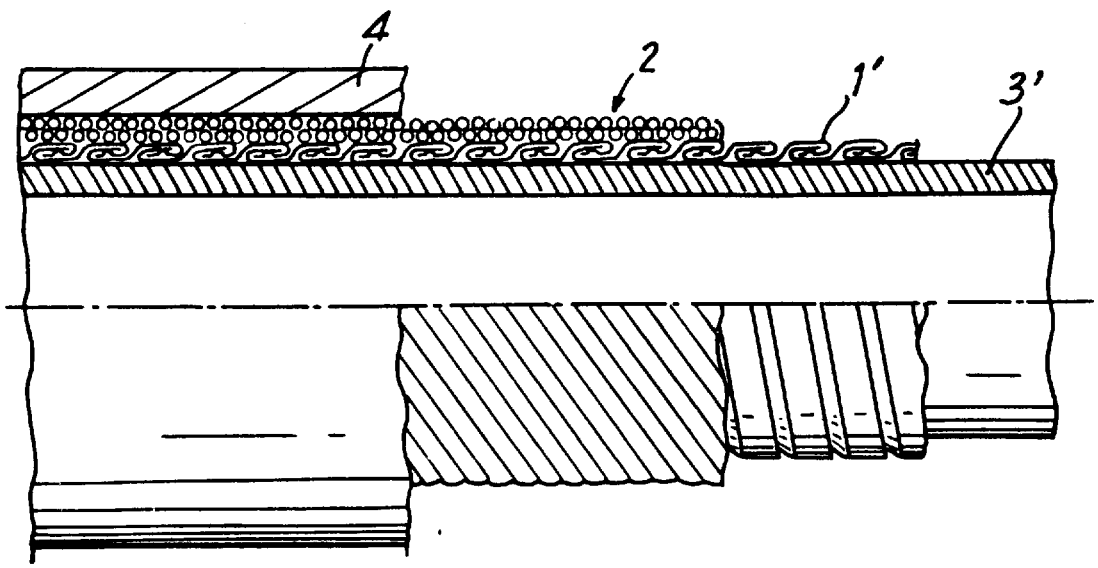
FIG. 2 is a similar view of a second embodiment of flexible tubular conduit according to the invention.

In the "smooth-bore" type of structure shown in FIG. 2 there is provided a waterproof inner tube 3' in contact with the tubular layer 1' consisting of the wound molded strip, and which provides on the one hand resistance to crushing and on the other hand resistance to the circumferential component induced by the internal pressure.

Figure 3:
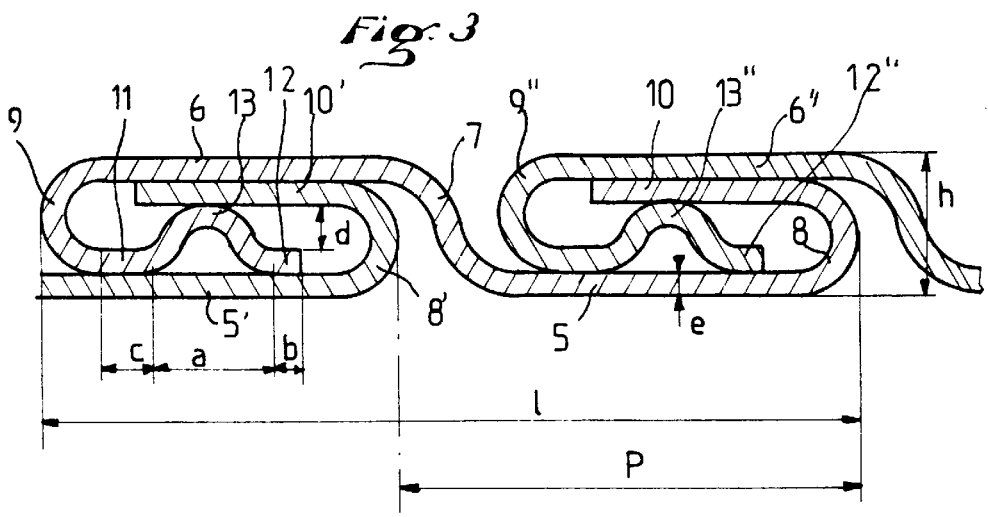
FIG. 3 represents a detail in section of the tubular layer, constituted by a molded strip, of the conduit of FIG. 1.

We shall now turn to FIG. 3.

The layer 1 is constituted by a spiral winding of a shaped or profiled strip as illustrated in FIG. 3, this strip being made of any metal material appropriate for the intended application, and capable of assuming the desired configuration by plastic deformation, such as austenitic, austenofferritic or ferritic stainless steel, of high-grade carbon steel, of galvanized steel, or of alloys having good resistance to corrosion such as Inconel, or aluminum alloys.

FIG. 3 represents the cross section of a spiral of the shaped or profiled strip in the wound state, and also, in a fragmentary manner, the cross section of the two spirals adjacent thereto.

In cross section the molded strip of a thickness e has a first principal cylindrical span 5 connected to a second principal cylindrical span 6 by an inclined central portion 7. The principal spans 5 and 6 are prolonged by convex radial portions 8 and 9, respectively. Radial portion 8 is prolonged by a first secondary span 10 concentric with span 5. The second radial portion 9 is prolonged by a second secondary span constituted by a cylindrical connecting section 11 and a cylindrical end section 12 between which is a looped intermediate section 13 whose concavity is turned away from the second principal span 6.

In the drawing, the corresponding spans of adjacent spirals have been identified by the same reference numbers followed by the indicators ' and ", respectively.

The height h of the tubular layer, the configuration and the dimensions of length a and height d of the intermediate looped section 13 are determined such that, as shown in the drawing, in the wound state of the strip, the cylindrical portions 11 and 12 are in contact on substantially their entire length c and b, respectively, with the first principal span 5' of an adjacent spiral and, preferably, the crest of the rounded midsection of the intermediate section 13 is in contact with the first secondary span 10' of the said adjacent spiral.

Furthermore, as seen in FIG. 3, the first secondary cylindrical span 10 is spaced radially from the first principal cylindrical span 5 such that it is in contact on substantially its entire length with the second principal cylindrical span 6" of the other adjacent spiral.

Figure 4:
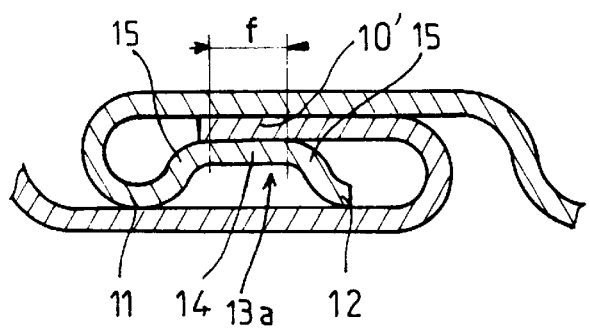
FIGS. 4 to 7 are views similar to FIG. 3 of variant embodiments.

In the embodiment in FIG. 4, the middle portion of the intermediate section 13a has a cylindrical span 14 contacting on its entire length f the first secondary span 10' of the adjacent spiral. The cylindrical span 14 is prolonged by two segments of curved cross section 15 in tangential contact, directly or via straight segments (not shown), with the lateral transitional portions with the sections 11 and 12.

In the case of FIG. 4, the lengths b and c of the cylindrical end section 12 and of the connecting section 11 are reduced to the minimum—virtually nil—but the two lateral transitional portions of the intermediate section 13a are regularly curved and make tangential contact with the confronting surface of the first principal span 5' of the adjacent spiral.

Figure 5:
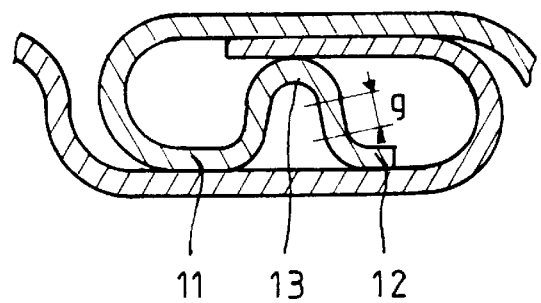
Figure 6:
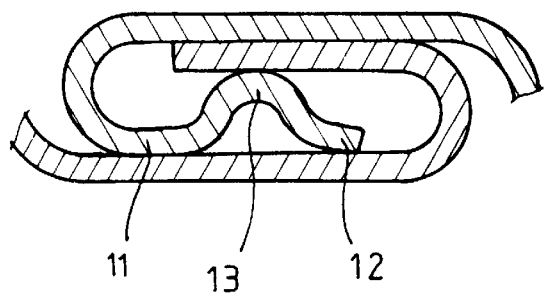
Figure 7:
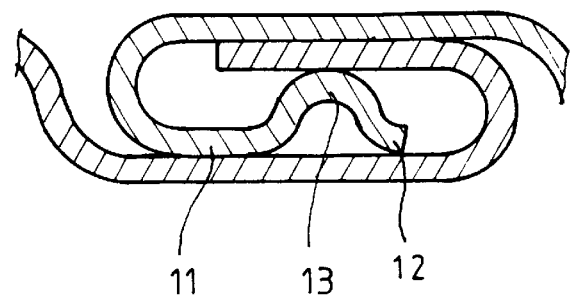

In the embodiment in FIG. 5, a straight connecting segment of length g is provided between the middle curved portion 14 of the intermediate section and each of the two lateral transitional portions. In the embodiment in FIG. 6, the end section 12 of the second secondary span is slightly conical, FIG. 7 showing a variant embodiment in which the length of this end section is very short, approaching a value of zero.

In the foregoing description of the shaped or profiled strip, it should be clear that the words: "first" (first span etc.) and "second" (second span etc.) are of relative meaning, one in relation to the other, to the effect that the first and the second principal span of the same spiral, being radially spaced, the tubular layer can be formed from the shaped or profiled strip in whichever of the two different ways desired, according to the following description.

(I) The "first" principal span can be on the inside, nearer the axis of the flexible tube than the second principal span; the intermediate, looped portion 13 formed by the second secondary span is then inside of the tube with respect to the first secondary span 10' of the adjacent spiral facing it.

(II) The first principal span is on the outside, and the intermediate, looped portion is then also on the outside.

Furthermore, the tubular layer can be produced by winding a single shaped or profiled strip of which the successive spirals interlock one with the other. It is possible, as a variant, to make it by winding two adjacent molded strips side by side, each spiral of one strip being gripped on each side by one of the two spirals of the other band bracketing it; this variant can be desirable in certain cases—for example in the case where the width of the gripped strip is relatively small in comparison with the diameter of the flexible tube.

A description will be given hereinbelow of two examples of flexible tubular conduits comprising a tubular layer formed by means of shaped or profiled strips having the cross section illustrated in FIG. 3, with the dimensional characteristics listed in the following Table 1.

The tubular layer is made by winding a shaped or profiled strip of type A181 304 austenitic stainless steel.

TABLE 1

|  | Example 1 | Example 2 |
|---|---|---|
| Strip used for forming the shaped or profiled strip |  |  |
| Thickness c mm | 0.7 | 1.5 |
| Width b mm | 40 | 113 |
| Shaped or profiled strip |  |  |
| d mm | 1.4 | 4.6 |
| a mm | 4.0 | 10.4 |
| b mm | 0.7 | 1.5 |
| c mm | 0.9 | 2.3 |
| l mm | 23.0 | 60.2 |
| Finished tubular layer |  |  |
| h mm | 4.2 | 10.6 |
| Diameter D mm | 101.6 | 304.8 |
|  | (4 in) | (12 in) |
| Pitch P mm | 13.3 | 33.4 |
| Weight kg/m | 5.5 | 37.7 |
| Crush resistance (bars) | 79 | 51 |

The unit weight given here is the weight of the tubular layer of medium pitch, of a length of one meter along the axis of the finished tube.

The crush resistance given corresponds to the limit of permanent deformation of the finished tubular layer under the effect of a uniform external pressure field. This value is directly related to the maximum water depth for the use of the flexible conduit according to the corresponding hydrostatic pressure, assuming the internal pressure of the conduit to be zero, and disregarding any strengthening of the flexible structure by other armoring elements of this structure.

The advantages of the shaped or profiled strip according to the invention can be appreciated by comparing Examples 1 and 2 to Examples 1a and 2a, respectively, listed in the following Table 2 and relating to finished molded strips as currently practiced, with a second secondary span having simply one concave axial section as illustrated, for example, in FR-A2,555,970.

TABLE 2

|  | Example 1a | Example 2a |
| --- | --- | --- |
| Strip used in forming the shaped or profiled strip |  |  |
| Thickness c mm | 0.7 | 2 |
| Width L mm | 28 | 80 |
| Shaped or profiled strip |  |  |
| Width 1 mm | 16.0 | 42.7 |
| Finished tubular layer |  |  |
| h mm | 3.5 | 10 |
| Diameter D mm | 101.6 | 304.8 |
|  | (4 in) | (12 in) |
| Pitch P mm | 9.7 | 27.6 |
| Weight kg/m | 5.3 | 45.3 |
| Crush resistance (bars) | 60.8 | 52 |

Made from a strip of the width L=28 mm, having the same thickness of 0.7 mm, so as to have a weight of 5.3 kg/m close to Example 1 for the same diameter 101.6 mm, Example 1a has a molded strip width of 16 mm, with a thickness b of the tubular layer of 3.5 mm, or 5 times the thickness, instead of 4.2 mm in Example 1.

It has been found that Example 1a offers a crush resistance of only 60.8 bars, against 79 for Example 1. A conduit using the shaped or profiled strip according to the invention can therefore, in the present case, be used in about 30% greater depths of water without increase of the amount of material used in making the tubular layer constituting its inner body.

Furthermore, the pitch is only 9.7 mm for Example 1a, instead of 13.3 mm. The rate at which the flexible metal tube is produced by the winders commonly used being normally proportional to the pitch of the helix formed by the interlocking strip, the length of time for the continuous production of a tube according to the invention is therefore, in this case, 27% shorter than for the equivalent tube of the prior art, representing a great reduction of t he cost of manufacture.

In the case of Example 2a, to obtain a crush resistance of 52 bars, substantially equal to that of Example 2, it is necessary to raise the thickness of the strip to 2 mm instead of 1.5 mm, with a width L of 80 mm.

The thickness h of the tubular layer is 10 mm, close to that of Example 1, but it represents only 5 times the value of the thickness e of the molded strip, instead of more th an 7 for Example 1. Since the weight of the finished tube thus increases from 37.7 to 45.3 kg/m, this 20% increase involves a particularly perceptible increase of the cost of manufacture in the case of tubes of relatively large diameter, such as Examples 2 and 2a, for which the cost of the materials used is predominant in the total cost of manufacture.

Furthermore, since the pitch is 27.6 mm in Example 2a instead of 33.4 mm, the time required for manufacture is 21% longer. Overall, for equal strength, the tubular conduit formed by the molded strip of Example 2a is approximately 20% more expensive than that of Example 1. Furthermore, the 20% increase in weight necessitates a reduction of the maximum usable depth under water, because this depends on the total weight of the conduit suspended from the surface with respect to the maximum admissible tensile stress of the flexible conduit.

Among other advantages, the molded strip according to the invention can be optimized in various ways according to the situation. In certain cases, the molded strip can be given a much larger winding pitch than is permitted by the known cross sections of the molded strip, by playing on the width of the strip used and on the width of the shaped or profiled strip, doing so without making the structure heavier or weaker; this possibility is particularly desirable in the case of tubes of small diameter—25 to 50 mm, for example. Alternatively, one may choose to reduce the weight of the structure to the minimum for a given crush resistance, by playing on the increase of the thickness h of the tubular layer; this possibility which is offered by the shaped or profiled strip according to the invention in comparison with the products of the prior art is particularly desirable for minimizing the cost of manufacture, especially in the case of relatively large diameters, which can amount to 250 to 500 mm, for example, or in the case where very expensive materials must be used, such as Inconel, in general to improve resistance to corrosion. Optimization of the ratio between the crush resistance and the weight is furthermore considerably important in the case of flexible tubes intended for great underwater depths.

On the basis of the results of the great amount of theoretical study and prototype testing devoted to studying the performance and the possibilities for the use of the molded strip according to the invention, it appears that the improvements observed are due in large measure to the increase in rigidity which is conferred on it by its particular shape. The great rigidity thus obtained permits substantially increasing both the l/e and the h/e ratios. In particularly, a higher value of the relative height h/e results in a considerable increase in the flexural rigidity of the molded strip, and consequently of the crush resistance of the tubular layer, as it has been confirmed. Since particularly interesting results have been obtained with an h/e ratio greater than 5, it should be noted that, to the applicant's knowledge, there does not exist any interlocking shaped or profiled strip that can be used in the flexible structures such as those contemplated by the invention, having a h/e ratio greater than 5. Furthermore, experimental prototype fabrication has shown surprisingly that the shaped or profiled strips according to the invention, produced in that manner by the conventional industrial manufacturing machines, have a remarkable quality of shape, superior to that obtained with the known cross sections, without the need to encumber the manufacturing costs by taking special precautions.

Thus, the tubular layers consisting of a shaped or profiled strip according to the invention can be used as one of the means for the reinforcement of flexible conduits whose waterproof quality is assured by an internal tube or sheath of plastic or elastomeric material. They can in particular constitute the internal body of flexible cables of the "rough bore" type. They can likewise be disposed on the interior of the flexible tube to serve as a mechanical means of protection. They can also constitute, for example, the arch to withstand the circumferential effects of the internal pressure of conduits of the "smooth bore" type.

But they can also by themselves alone constitute flexible tubular conduits of the "flexible metal tube" type such as those described by the French NF standards referred to above, supplemented, if desired, by gaskets placed in the hollow formed by the looped intermediate section.

Any other known applications of flexible metal tubes can also be envisaged, the flexible conduit can be made from the tubular layer formed by the shaped or profiled strip, for example, by enveloping the tubular layer in a plastic or elastomeric sheath, or by disposing it around an internal plastic or elastomeric tube.

Although the invention has been described in connection with particular embodiments, it is obvious that it is by no means limited thereto, and that variants and modifications can be made in them without thereby departing from its scope or its spirit.

We claim:

1. A crush resistant flexible tubular conduit capable of withstanding high external hydrostatic pressures comprising at least one tubular layer constituted by at least one profiled ban having a cross-section substantially in the shape of an elongated S, wound helically with a small pitch and with interlocking of successive turns, the profiled band having a cross-section formed from first (5) and second (6) main portions which are cylindrical, coaxial, radially spaced and joined by a central portion (7) inclined in relation to the longitudinal axis of the conduit, each of the first and second main cylindrical portions being joined by a first convex radial portion (8) to a first cylindrical secondary portion (10) and by a second convex radial portion (9) to a second secondary portion (11, 12, 13), and the first secondary portion being radially spaced from the first main cylindrical portion by a distance such that, in the helically wound state of the profiled band, it is substantially applied over its entire length against the second main portion of an immediately adjacent turn (6"), wherein the second secondary portion comprises a section (11) connecting a discrete end section (12) to the second convex radial portion (9) through a wave-shaped intermediate section (13) which is in contact with a first secondary portion (10') of another immediately adjacent turn and which has a concavity directed away from the second main portion (6), and wherein the second secondary portion (11, 12, 13) is arranged so that in the wound state of the band said connecting section (11) bears on the first main portion (5') of the other adjacent turn, characterized in that, in the wound state of the band the discrete end section (12) bears, in face-to-face contact at its end surfaces remote from the intermediate section on the first main portion (5') of said other adjacent turn.

2. A crush resistant flexible tubular conduit according to claim 1, characterized in that the end discrete section (12) is cylindrical and is applied substantially over its entire length against said first main portion (5') of the other adjacent turn.

3. A crush resistant flexible tubular conduit according to claim 1, characterized in that the width l of the profiled band, that is to say the distance measured in the axial direction between the crests of the convex radial portions (8, 9) of the band; satisfies the following relationship:

$50e \leq l \leq 100e$ e being the thickness of the band.

4. A crush resistant flexible tubular conduit according to claim 1, characterized in that the crest of the intermediate section (13) is applied against the first secondary portion (10') of said other adjacent turn.

5. A crush resistant flexible tubular conduit according to claim 1, characterized in that the median portion of said wave-shaped intermediate section (13) has a cross-section of rounded shape and is tangentially connected to two curved lateral transition portions and having a direction of curvature which is inverted in relation to that of said median portion.

6. A crush resistant flexible tubular conduit according to claim 1, characterized in that the median portion of the said wave-shaped intermediate section (13a) comprises a cylindrical central portion (14) preferably substantially in contact over its entire length (f) with the first secondary portion (10') of said other adjacent turn and which is flanked by two curved segments (15), said median portion being tangentially connected to two curved lateral transition portions and having a direction of curvature which is inverted in relation to that of the curved segments (15).

7. A crush resistant flexible tubular conduit according to claim 1, characterized in that the length b of the end section (12) of the second secondary portion satisfies the following relationship:

$b \geq 0.5e$, e being the thickness of the profiled band.

8. A crush resistant flexible tubular conduit according to claim 1, characterized in that the length a of the wave-shaped intermediate section (13) of the second secondary portion satisfies the following relationship:

$3e \leq a \leq 8e$ e being the thickness of the profiled band.

9. A crush resistant flexible tubular conduit according to claim 1, characterized in that the height d of the wave-shaped intermediate section (13) of the second secondary portion satisfies the following relationship:

$0.5e \leq d \leq 3.5e$ e being the thickness of the profiled band.

10. A crush resistant flexible tubular conduit according to claim 1, characterized in that the thickness h of the tubular layer satisfies the relationship:

$h \geq 4.5e$ e being the thickness of the band.

11. A crush resistant flexible tubular conduit according to claim 1, characterized in that the length c of the second section (11) for connecting the second secondary portion satisfies the following relationship:

$c \leq 4e$ e being the thickness of the profiled band.

12. A crush resistant flexible tubular conduit according to claim 1, characterized in that the average pitch P of the helix formed by the winding, that is to say the distance measured in the axial direction between the first convex radial portions (8, 8') of two successive turns, satisfies the following relationship:

$0.05D \leq P \leq 0.5D$

D being the internal diameter of the tubular layer formed.

13. A flexible crush-resistant conduit according to claim 1 characterized in that the length (b) of the end section (12) of the second secondary portion satisfies the following relationships:

$0.5e \leq b \leq 2e$, e being the thickness of the profiled band.

* * * * *